United States Patent [19]

Abshire

[11] Patent Number: 4,600,299
[45] Date of Patent: Jul. 15, 1986

[54] OPTICAL DISTANCE MEASURING INSTRUMENT

[75] Inventor: James B. Abshire, Laurel, Md.

[73] Assignee: The United States of America as represented by the Administrator of the National Aeronautics and Space Administration, Washington, D.C.

[21] Appl. No.: 406,820

[22] Filed: Aug. 10, 1982

[51] Int. Cl.⁴ .............................................. G01C 3/08
[52] U.S. Cl. .......................................... 356/5; 356/4.5
[58] Field of Search .................. 356/4, 5, 28.5, 28, 356/4.5

[56] References Cited

U.S. PATENT DOCUMENTS

| | | | |
|---|---|---|---|
| 3,409,370 | 11/1968 | King et al. | 356/5 |
| 3,437,820 | 4/1969 | Thompson, Jr. et al. | 356/5 X |
| 3,446,971 | 5/1969 | Ruddock | 356/5 X |
| 3,522,992 | 8/1970 | Jaffe | 356/5 |
| 3,542,772 | 11/1970 | Vaniz | 356/4 |
| 3,625,619 | 12/1971 | Scholdstrom | 356/5 X |
| 3,733,129 | 5/1973 | Bridges | 356/5 |
| 4,005,936 | 2/1977 | Redman et al. | 356/5 |
| 4,035,062 | 7/1977 | Fletcher et al. | 356/5 |
| 4,097,148 | 6/1978 | Fry | 356/5 |
| 4,148,587 | 4/1979 | Erdmann et al. | 356/5 X |
| 4,182,570 | 1/1980 | Courrier et al. | 356/5 X |
| 4,229,102 | 10/1980 | Wiklund et al. | 356/5 |
| 4,239,388 | 12/1980 | Green | 356/5 |
| 4,240,745 | 12/1980 | Green | 356/4 X |
| 4,240,746 | 12/1980 | Courtenay et al. | 356/5 |
| 4,413,905 | 11/1983 | Holzapfel | 356/5 |

*Primary Examiner*—S. C. Buczinski
*Assistant Examiner*—John B. Sotomayor
*Attorney, Agent, or Firm*—John O. Tresansky; John R. Manning

[57] ABSTRACT

An optical instrument (10), such as a stability monitor or a target range finder, uses an unstabilized laser (12) to project a composite optical signal of coherent light having two naturally occurring longitudinal mode components. A beamsplitter (24) divides the signal into a reference beam (26) which is directed toward one photodetector (28) and a transmitted beam (42) which illuminates and is reflected from a distant target (44) onto a second photodetector (52) optically isolated from the first photodetector. Both photodetectors are operated on the square law principle to provide electrical signals modulated at a frequency equal to the separation between the frequencies of the two longitudinal mode components of the optical signal projected by the laser (12). Slight movement of the target may be detected and measured by electrically monitoring the phase difference between the two signals provided by the photodetectors and the range of the target measured with the aid of microprocessor (132) by changing the separation between the longitudinal modes by shifting the length of the resonator cavity in an iterative series of increments.

6 Claims, 4 Drawing Figures

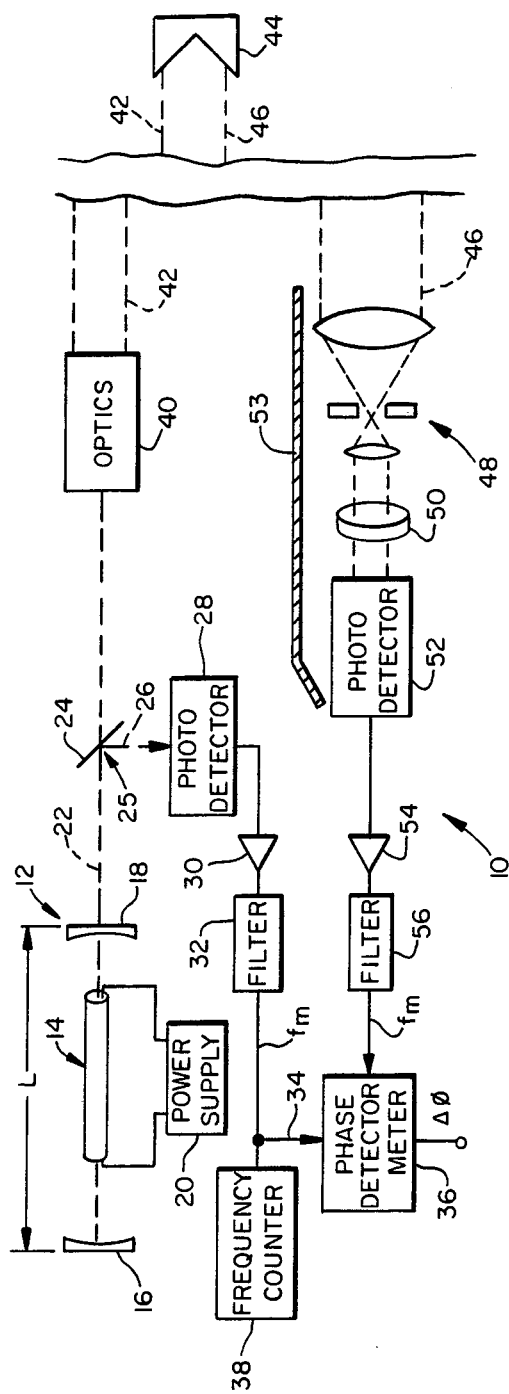
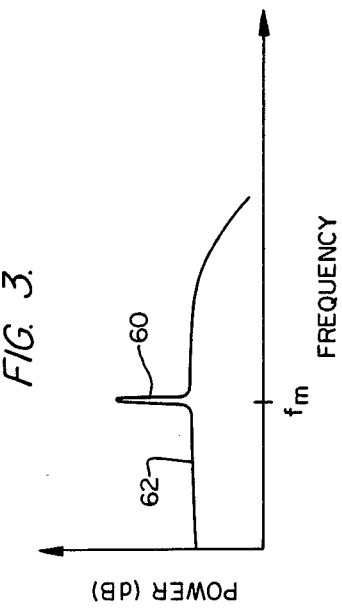
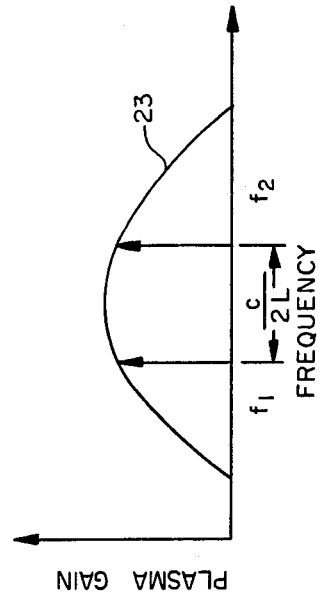
FIG. 1.
FIG. 2.
FIG. 3.

OPTICAL DISTANCE MEASURING INSTRUMENT

ORIGIN OF THE INVENTION

The invention described herein was made by an employee of the United States government and may be manufactured and used by or for the Government for governmental purposes without the payment of any royalties thereon or therefor.

TECHNICAL FIELD

This invention relates to optical transmission and receiving systems and, more particularly, to distance measuring instruments.

BACKGROUND ART

Optical instruments projecting a beam of coherent light have been used in such applications as topographic land surveying and building construction to measure line-of-sight distances to a remote target by comparing one or more characteristics of the light beam reflected from the target with the same characteristics of the projected beam. Instruments projecting a continuous wave of coherent light typically treat the distance to be measured as a function of the frequency and phase difference between the reflected and projected light beams. In exemplary form, continuous wave optical distance measuring instruments electro-optically modulate the amplitude of a beam of light and project the beam towards a stationary remote target located a known approximate distance from the instrument. The portion of the beam reflected along a path parallel with the projected beam back to the instrument from the target, e.g., a corner cube reflector, is directed via receiving optics onto a photo-detector circuit. The phase difference between the reflected portion of the modulated beam and a reference portion is a function of the fractional distance between the instrument and the target.

In one type of instrument, the precise distance between the instrument and target is determined by combining the reflected and local beam portions at a single photo-detector. The amplitude of the signal provided by the photo-detector is determined by the intensity of the combined waveform envelopes of the local and reflected beam portions which, in turn, depend upon the phase difference between the reference and reflected beams caused by the fractional difference between their path lengths.

In another type of instrument, a laser light source with a resonant internal cavity of length L is used to generate a light beam having two frequency components approximately spaced apart by C/2L, where C is the velocity of light. One portion of the light beam is projected towards the target while a second portion is projected towards a locally positioned reference surface within an external cavity having a manually variable, calibrated cavity length. The reference beam emerging from a retro-reflector in the cavity is combined with a portion reflected from the target and the combined beam is focused upon a single photocell operated to provide a conventional square law response characteristic. Square law operation provides a quadratic signal to the incident radiation containing a component at the difference frequency proportional to the product of the amplitude of the reference and reflected beams. The precise distance between the instrument and target may be determined in a null seeking procedure by calibrating adjustments of the external cavity length, taking multiple measurements at different external cavity lengths for successive interference minima, and simultaneously solving a standard algorithm for different external cavity lengths as a function of successive minima.

Neither of these types of state of the art instruments is suitable for motion detection in such applications as monitoring the stability of a normally stationary target such as a building or a newly erected load bearing structure at a construction site, because a change in the path length between either type of instrument and a remote target only can be detected if the phase of the reference and reflected beams happen to coincide precisely. Unambiguous measurement of the distance between the instrument and a remote target may be measured with these types of instruments only by continuously dithering the external retro-reflector cavity to maintain a phase null. Furthermore, stray internal optical coupling within receiver networks in instruments using a single element for detection of both the local and reflected beams may create false interference effects, i.e., interference signals vectorially added to the reflected beam portion, and thereby provide an incorrect indication of phase difference. These errors may be small when using low powered laser transmitters but, at the higher laser powers necessary to measure distances greater than several hundred yards, false interference effects become intolerable. Laser transmitter systems which use external modulators typically require high power modulator drive signals. This makes the receiver circuit susceptable to the electro-magnetic fields generated at the transmitter, which also can cause interference effects. In currently developed systems of this type, these false signals limit the accuracy and maximum range of the measurement system.

Where the receiving network includes a local optical oscillator for heterodyning the local and reflected beams, the optical phase must be controlled between the local oscillator and the reflector signal to prevent introduction of error due to phase drift. Control of the optical phase is very difficult, however, particularly if the target is not stationary relative to the instrument (movement causes doppler shift). To avoid this difficulty, one instrument uses a dual frequency laser in its transmitting network to generate a pair of co-collimated and very closely-spaced optical signals. A pair of cubic response optical detectors in the receiving network are simultaneously exposed to a local portion and a reflected portion, respectively, of the dual frequency optical signal while modulated by a common microwave oscillator signal. The laser transmitting network in this type of system requires radio frequency modulation. The use of cubic response photo-detectors permits the receiving network to heterodyne the local and reflected optical beams while substituting an easily met requirement for controlling phase differences between the local oscillator and the heterodyned reflected beam of microwave frequencies for the more difficult requirement of controlling the phases of the local oscillator signal and reflected beam at optical frequencies. Cubic response photo-detectors are experimental devices and are not as readily available as are square law photo-detectors. Furthermore, they necessitate a more complicated receiver network using more than one local oscillator.

Accordingly, it is one object of the present invention to provide an improved optical distance measuring instrument.

It is another object to provide a simplified optical distance measuring instrument.

It is still another object to provide a more accurate optical distance measuring instrument.

It is a further object to provide an optical distance measuring instrument to automatically measure the range of a target.

It is still further object to provide an optical measuring instrument to continuously measure the fractional movement of a target.

These and other objects are achieved with an optical distance measuring instrument detecting the phase position between the difference frequency component of a composite, continuous wave optical signal of coherent light having two co-collimated longitudinal mode components. The instrument has a laser generating a composite optical signal, including co-collimated longitudinal mode components separated by an adjustable difference frequency. The signal generated is locally split into two portions and a reference beam portion is directed onto a square law photo-detector while the remainder of the signal is projected to illuminate a distant target. A reflected beam is directed onto a second square law photodetector optically isolated from the first photodetector and the reference beam. The difference frequency components of the electrical signals provided by the photo-detectors may be applied to an radio frequency phase meter. Any change in the fractional distance between the instrument and the target will be instantly indicated by the phase meter as a shift in the phase difference between the reference and reflected difference frequency components.

Alternatively, ambiguities in measurement of the target distance may be resolved by coupling the difference frequency component of the reference signal to a frequency counter and then feeding the phase meter and frequency counter output signals to a range control computer which, by a series of iterations varying the laser cavity length, can precisely determine the distance between the instrument and target.

BRIEF DESCRIPTION OF THE DRAWINGS

A more complete appreciation of this invention and, many of the attendant advantages thereof, will be readily apparent as the same becomes better understood by reference to the following detailed description when considered in conjunction with the accompanying drawings in which like numbers indicate the same or similar components, wherein:

FIG. 1 is a block diagram showing one embodiment of the invention.

FIG. 2 is a two coordinate graph showing a plasma gain profile of a the laser shown in FIG. 1 as a function of its optical frequency spectrum.

FIG. 3 is a two coordinate graph showing a typical frequency spectrum provided by a photodetector operated in a square law mode when illuminated by the laser shown in FIG. 1.

DETAILED DESCRIPTION OF THE INVENTION

Figure 4:
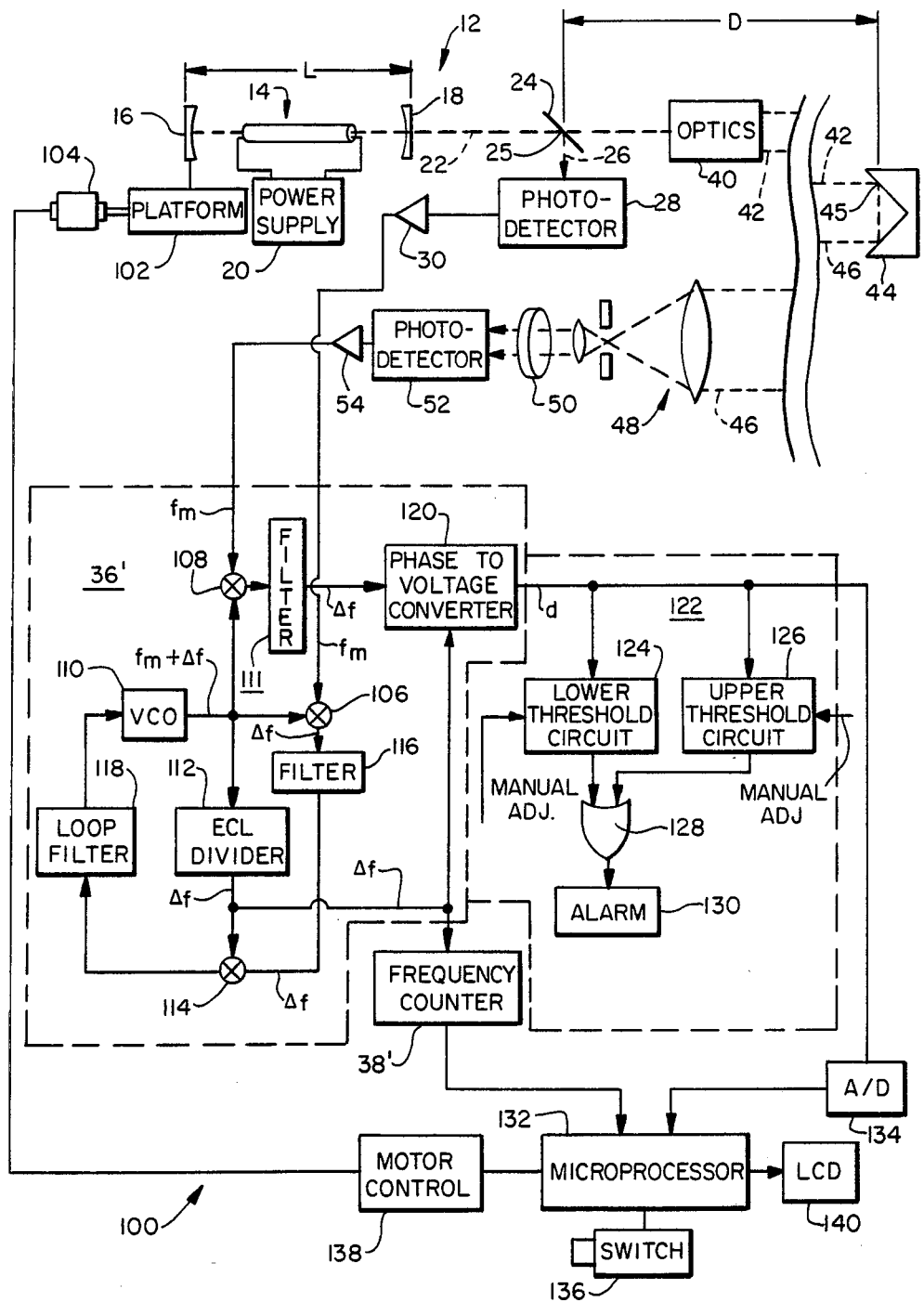
FIG. 4 is a block diagram showing an alternative embodiment of the invention.

FIG. 1 illustrates a distance measuring instrument 10 which uses a laser 12 having a gaseous plasma medium 14 as the active component of a laser transmitter. The gaseous medium 14 is excited without external modulation inside a simple, unstabilized resonant cavity of length L formed by two opposed end mirrors 16, 18. Power for the laser is supplied by an external supply 20. The instrument is designed to use two of the longitudinal modes naturally present in any laser to naturally modulate the beam 22 projected. As shown in FIG. 2, the laser must have a plasma gain profile 23 wider than the C/2L separation between the respective frequencies $f_1$, $f_2$ of the two longitudinal modes. In effect the separation between the two longitudinal modes, $f_m$ is:

$$f_m = f_2 - f_1. \qquad (1)$$

To create an electrical signal for referencing the frequency and instantaneous phase of the projected beam 22, only a small fraction of the projected beam energy is required; the energy required may be obtained by inserting a beamsplitter 24 having a partially reflective surface 25 into the path of the projected beam. The partially reflected surface passes most of the beam energy but a small fraction is diverted as a reference beam 26 onto a photodetector 28 operated to provide a square law electrical response to an active radio frequency electronic amplifier 30. The photodetector may be made stationary relative to the surface of beam splitter 24. The amplified signal passes through a multi-pole bandpass filter 32 set to attenuate all but the longitudinal mode separation frequency $f_m$. The filtered separation frequency $f_m$ is fed into a first or reference channel 34 of a radio frequency phase meter 36. To determine the precise frequency at which the laser beam 22 is modulated, the filtered separation frequency $f_m$ may be fed into a frequency counter 38. The reference photodetector 28 is mounted in a stationary position relative to beamsplitter 24 to provide a fixed pathlength for reference beam 26, thereby eliminating any need to adjust or recalibrate the reference beam pathlength when using the instrument.

The remainder of the composite optical signal is passed by the beam splitter 24 and transmitted via collimating optics 40 as a beam 42 of light to illuminate a distant and nominally stationary target 44, such as a retro-reflector or a corner cube attached to the wall of a building. Some energy reflected from the target travels as a weak beam 46 along a path parallel to the projected beam 42. The reflected beam may be collected by a receiving optic system 48, such as a telescope, and passed through an optical bandpass filter 50 to remove stray background light. The optically filtered reflected beam is then directed onto a second photodetector 52 operated to provide a square law electrical response. Photodetector 52 may also be mounted stationary relative to beamsplitter 24 to prevent its misalignment from the axis of the reflected beam. Both the reflected beam and the second photodetector 52 are maintained in optical isolation from the reference beam 26 and the reference photodetector 52 by an opaque screen 53 to avoid the introduction of such sources of error as cross-talk between the two beams. The photodetector 52 may be coupled to an active, radio-frequency amplifier 54 to provide amplification of the square law electrical response. The amplified square law response is then passed through a multi-pole bandpass filter 56 set to attenuate all but the longitudinal mode separation frequency $f_m$ of the reflected beam. This filtered separation frequency is fed into a second channel of the phase meter 38 where the phase difference between the reference and reflected beams 42, 46 may be continuously measured.

Ignoring the presence of any optical components within the resonator cavity having different indicies of refraction, the separation between the two longitudinal mode frequencies, $f_m$, equals C/2L, where L is the cavity length. Commercially available photodetectors 28, 52 such as photomultipliers or photodiodes usually provide a square law electrical response. When illuminated by the dual frequency optical signal emitted by laser 12, therefore, the voltage of the electrical responses of both photodetectors are modulated at the longitudinal mode separation frequency, $f_m$, thereby providing electrical signals with a frequency component at the separation frequency. FIG. 3 illustrates an exemplary electrical frequency spectrum of a typical photodetector showing the amplitude of a naturally occuring beat note 60 at the separation frequency rising significantly above the resonse 62 due to background noise. The response of the photodetectors 28, 52 at the separation frequency may be expressed as:

$$V_o = A \cos(2\pi f_m t). \quad (2)$$

The unknown distance, D, between the instrument 10 and the target 44 equals the difference in path lengths between the reference and reflected beams, and may be written in terms of the separation frequency as:

$$D = (c/2f_m) \cdot (N+d) \quad (3)$$

where N is an unknown integer and $d = \theta/2\pi$, a normalized phase difference. The value of d is directly measured by the phase meter 38. By substituting equation (1) into equation (3), $$D = L(N+d), \quad (4)$$

and it is apparent that for a normally stationary target (where N remains constant), the instrument can monitor the stability of the target by detecting slight movements of the target as variations in the phase difference measured by phase meter 38. The amount of slight target movements may be directly measured by calibrating the phase meter scale in increments of the resonator cavity length because the changes in the target range, $\Delta D$, may be expressed as:

$$\Delta D = L \, \Delta d. \quad (5)$$

Therefore, the instrument may be used to automatically detect and simultaneously measure slight changes in the distance between the instrument and a normally stationary distant target.

Applications other than stability monitoring, e.g., land surveying, may require an unambiguous measurement of target distance, D, between the site 25 of the beamsplitter 24 and the instrument. FIG. 4 illustrates an instrument 100 having a receiver network modified to automatically alter the laser resonator cavity length and provide an accurate measurement of target range. In this embodiment, laser end mirror 16 is mounted on a platform 102 capable of being driven by a stepper motor 104 in either direction along the longitudinal axis of the resonator cavity to incrementally change the cavity length, L. Both the reference and reflected optical beams 26, 46 are directed onto their respective photodetectors 28, 52 in optical isolation and the resulting photodetector electrical signals are individually amplified by active electronic devices 30, 54. These electrical signals have frequencies equal to the longitudinal mode separation frequency, $f_m$, which may be on the order of several hundred mega-hertz. To avoid the expense of a commercially available phase detector 36 suitable for use at that frequency range, the photodetector signals may be translated downward in a conventional heterodyne stage 36' to a lower frequency range by individually feeding both signals into different mixer stages 106, 108. A voltage controlled oscillator 110 supplies a locally oscillated signal at a frequency, $f_m + \Delta f$, slightly offset from the longitudinal mode separation frequency, $f_m$, to both mixer stages. The mixer stages provide separate beat notes at the offset frequency $\Delta f$. The oscillator signal is also supplied to a preset emitter coupled logic frequency divider 112, where it is divided by an integer number to provide a signal at the offset frequency, $\Delta f$. The offset frequency is preferably selected to be an even integer fraction of the longitudinal mode separation frequency so as to facilitate heterodyning. Preferably, the integer value M equals $1 + (f_m/\Delta f)$. The output of the frequency divider is fed to a third mixer stage 114 and to a frequency counter 38'. The beat note from the reference signal mixer 106 is passed through a multipole filter 116 set to pass signals at the offset frequency, $\Delta f$, and applied to a third mixer stage 114. This mixer provides signal having a voltage proportional to any difference between the phases provided by divider stage 112 and bandpass filter 116. This component is passed through a low pass filter 118 in an offset phase locked loop arrangement and is applied as a feedback voltage to control the frequency of the signal generated by oscillator 110. Consequently, the offset frequency components, $\Delta f$, provided by mixer stage 108 and emitter coupled logic divider 112 differ only by an angle precisely equal to the phase difference, $\Delta \theta$, between the $f_m$ frequency component of the electrical signals generated by the reference and reflected beam photodetectors 28, 58. These offset frequency components are applied to different channels of a conventional phase-to-voltage converter stage 120 to provide a signal having an amplitude proportional to the normalized phase difference d.

For applications such as stability monitoring of newly erected buildings, automatic sensing of target movement is sufficient because only changes in the phase difference need to be detected. In such applications, the normalized phase difference voltage may be applied to an alarm network 122 having a lower limit threshold stage trigger 124 in parallel with a higher limit threshold trigger stage 126. Both threshold stages may have manually adjustable threshold limits. Both threshold stages may be applied to different ports of a logical OR gate 128 which, in turn, may control an audible alarm circuit 130. A change in phase difference falling below the limit of the lower threshold stage 124 due to slight movement (less than one laser modulation wavelength) of a target toward the instrument will cause stage 124 to apply a logical ONE signal to OR gate 128, thereby causing gate 128 to activate alarm 130. Similarly, a change in phase difference exceeding the limit of the higher threshold stage 126 due to slight movement of the target away from the instrument will cause alarm 130 to be activated.

For applications such as rangefinding or land surveying which require precise determination of the distance between the site of the reflecting surface 25 of beamsplitter 24 and the point of incidence 45 on the reflecting surface of the remote target 44, the ambiguity in the unknown number of integer wavelengths must be resolved. In such applications, a low frequency counter 38' may be coupled to the logic divider stage 112 to accurately determine the offset frequency, Δf, and supply the measured value to one channel of a commercially available control and computational microprocessor 32 e.g., a DEC model LSI-11. An analog to digital converter 134 coupled to the phase to voltage converter stage 120 provides a digital representation of the normalized phase difference, d, to a second channel of the microprocessor 132. The microprocessor may be programmed to follow a sequence of six steps when manually activated by a switch 136 externally mounted on the instrument. In the first step, the microprocessor clears two of its internal binary counters to zero and then enters the initial values of the separation frequency and normalized phase difference, $d_1$, provided by frequency counter 34' and converter 134, respectively. In the second step, the microprocessor activates a stepper motor control stage 138 to rotate the shaft of electric step motor 104 a set number of increments. This causes mirror mount 102 to move end mirror 16 and changes the length, L, of the laser resonator cavity. Then, in the third step, the microprocessor determines whether the current value of the normalized phase difference equals the initial value, $d_1$. If no equality is found, motor 104 is stepped a second time and the microprocessor checks again for equality. The second and third steps are repeated until equality is found. Once the current value of phase difference is found to equal the initial value, the microprocessor procedes to the fourth step and determines whether a third internal binary counter has counted a preset integral number, m, of phase changes. The motor 104 is stepped in a repeat of the second and third steps if the preset number of phase changes has not been reached. Once the preset integer number of phase changes has been reached, the current value of the separation frequency provided by frequency counter 34' is read into the first of the internal memories and the microprocessor may compute the target distance according to the equation:

$$D = c \cdot m / [2(f_{m2} - f_{m1})]. \quad (6)$$

Here the modulation frequencies $f_{mi}$ can be found from the frequency counter readings $\Delta f_i$ by:

$$f_{mi} = (M-1)\Delta f_i, \quad (7)$$

where M is the integer divisor of the ECL divider circuit 112. The calculated value of D may be then visually presented to the operator of the instrument by such devices as a liquid crystal display 140 fed by the microprocessor.

It is apparent, therefore, that the use of a pair of stationary square law photodetectors arranged to separately detect the difference frequency between naturally occurring longitudinal frequency modes in a reference beam and a reflected beam derived from a single composite optical signal, allows an inelaborate optical distance measuring instrument to be made with an inexpensive, commercially available laser source having a simple, unstabilized resonator cavity as its transmitter. The use of a pair of photodetectors permits both the photodetectors and the reference and reflected beams to be optically isolated, thereby eliminating sources of error due to cross-talk and modulation between the beams. Despite its simplicity, the precise target range as well as the fractional part of the distance between the instrument and the target may be continuously and automatically determined without manual adjustment of the optical path lengths external to the resonator cavity or modulation of the laser source or movement of either of the photodetectors because the electrical signals provided by the photodetectors are both modulated at a longitudinal mode separation frequency determined by the resonant cavity length. They differ in phase by an angle proportional to the difference in path length between the reference and transmitted beams. Elimination of the need for movement between one or both of the photodetectors and the site of the beamsplitter allows be path length of reference beam 26 to the fixed, thereby enhancing the accuracy of the instrument by avoiding introduction of error due to such sources as faulty calibration of an adjustable external retro-reflector cavity.

Some modifications in the construction of the instrument are within the scope of the invention. For example, radio frequency filters, either crystal or cavity types, or phase locked loops may be used in the receiver in the receiver system. Also the gas laser can be replaced by a semiconductor laser (such as GaAs), which would further reduce the instrument size.

What is claimed is:
1. An optical measuring instrument comprising:
   means (12) having a resonant cavity for projecting to a site a composite optical signal of coherent light having co-collimated longitudinal mode components frequencies separated by a difference frequency;
   first and second optical detectors (28, 52) optically isolated from one another external to said resonant cavity operating on a square law principle;
   means (24) positioned in the path of said optical signal for splitting said composite optical signal into a plurality of beams (42, 26) and for directing one of said beams (42) towards a target (44) and the other of said beams (26) directly onto the first of said optical detectors (28) whereupon said first optical detector provides a first electrical signal modulated at said difference frequency;
   means (48) for collecting and focusing the reflection of said composite optical signal from said remote target upon said second optical detector (52) whereupon said second optical detector provides a second electrical signal modulated at said difference frequency; and
   means (36/36') responsive to the relative phase of said first and second electrical signals for providing an indication proportional to the phase difference between said first and second electrical signals.
2. An optical measuring instrument comprising:
   a laser (12) having a resonant cavity of length L projecting a composite optical signal (22) having co-collimated longitudinal mode frequency components at $f_1$ and $f_2$ separated by a difference frequency of $f_m = c/2L$ to a site external to said cavity;
   a partially reflective surface (24) positioned along the path of said composite optical signal at said site to reflect a portion of said optical signal as a reference beam (26) and pass the remainder of said optical signal towards a target (44) as an illuminating beam (42);
   a first square law optical detector (28) positioned external to said resonant cavity in fixed separation from said partially reflective surface (24) generating a first electrical signal modulated at said differ- ence frequency in response to reception of said reference beam (26);

an optic system (48) aligned to collect and focus a beam (46) reflected from said target along a path parallel to said illuminating beam;

a second square law detector (52) positioned externally to said resonant cavity in alignment with said optical system in optical isolation from said first optical detector generating a second electrical signal modulated at said difference frequency in response to reception of said reflected beam; and means (36, 36') responsive to the relative phase of said first and second electrical signals for supplying an indication proportional to the difference in phase between said first and second electrical signals, wherein said phase determining means comprises:

means (110) for generating an incremental signal varying in frequency by an offset frequency f in proportion to the amplitude of a control signal applied to said generating means;

means (106) coupled to receive said incremental signal and said first electrical signal for producing a first reference signal modulated at said offset frequency;

means (108) coupled to receive said incremental signal and said second signal for producing a measurement signal modulated at said offset frequency and differing in phase from said first reference signal by an angle equal to the difference in phase between said first and second electrical signals;

means (112) coupled to receive said incremental frequency for dividing said incremental frequency by an integer value to produce a second reference signal modulated at said offset frequency and differing in phase from said measurement signal by said phase angle;

means (114, 116, 118) responsive to said first and second reference signals for supplying to said generating means a control signal having an amplitude proportional to the variation in phase between said first and second reference signals; and means (120) coupled to receive said measurement and second reference signals for yielding a phase signal proportional in amplitude to said phase angle.

3. The optical instrument of claim 2 wherein said resonant cavity has one boundary formed by a moveable reflective surface (16/18).

4. The optical instrument of claim 3 further comprising:

means (102, 104) responsive to external driving for shifting said movable reflective surface along the longitudinal axis of said resonant cavity; and means (38', 132, 134, 138) receptive to the frequency of said second reference signal and the amplitude of said phase signal for driving said shifting means until phase signal amplitude has varied through an integer number of cycles.

5. An optical measuring instrument comprising:

a plurality of opposed reflective surfaces (16, 18) forming a resonant optical cavity defining a plurality of longitudinal modes;

a lasing medium (14) axially aligned between said reflective surfaces and generating a composite beam of coherent light passing through one of said reflective surfaces and having frequency components at said longitudinal modes separated by a difference frequency;

a first photodetector (28) exhibiting a square law electrical response to illumination by said coherent light;

a beamsplitter (24) positioned within said composite beam at a fixed distance from said first photodetector to divert a fraction of said composite beam toward said first photodetector;

a second photodetector (52) optically isolated from said first photodetector, exhibiting a square law electrical response to illumination by said coherent light;

an optic system (48) for collecting and focusing onto said second photodetector the reflection from a target of the portion of said composite beam passing through said beamsplitter; and a phase meter (36) responsive to the difference in phase between said first and second photodetector electrical responses for providing an electrical signal indicative of said difference in phase.

6. An optical measuring instrument comprising:

a plurality of opposed reflective surfaces (16, 18) forming a resonant optical cavity defining a plurality of longitudinal modes;

a lasing medium (14) axially aligned between said reflective surfaces and generating a composite beam of coherent light passing through one of said reflective surfaces and having frequency components at said longitudinal modes separated by a difference frequency;

a first photodetector (28) exhibiting a square law electrical response to illumination by said coherent light;

a beamsplitter (24) positioned within said composite beam at a fixed distance from said first photodetector to divert a fraction of said composite beam toward said first photodetector;

a second photodetector (52) optically isolated from said first photodetector and exhibiting a square law electrical response to illumination by said coherent light;

an optical system (48) for collecting and focusing onto said second photodetector the reflection from a target of the portion of said composite beam passing through said beamsplitter;

a voltage controlled oscillator (110) generating a incremental signal varying in frequency from said difference frequency by an offset frequency determined by the amplitude of an external control signal;

a first mixer stage (106) responsively coupled to said first photodetector for receiving said incremental signal and first photodetector electrical response, and providing a first reference signal modulated at said offset frequency;

a second mixer stage (108) responsively coupled to said second photodetector for receiving said incremental signal and second photodetector electrical response, and providing a measurement signal modulated at said offset frequency;

a frequency divider stage (112) responsively coupled to receive said incremental signal and producing a second reference signal by dividing said incremental signal by an integer number;

a third mixer stage (114) responsively coupled to said frequency divider stage for providing said control signal to said oscillator upon reception of said first and second reference signals; and a phase-to-voltage converter stage (120) responsively coupled to said second mixer stage and said frequency divider stage to provide a voltage varying in amplitude in proportion to the difference in phase between said second reference signal and said measurement signal.

* * * * *